United States Patent
Follis et al.

(10) Patent No.: US 9,614,681 B2
(45) Date of Patent: Apr. 4, 2017

(54) PRIVATE ELECTRONIC SIGNATURE SERVICE FOR ELECTRONIC DOCUMENTS

(71) Applicant: Adobe Systems Incorporated, San Jose, CA (US)

(72) Inventors: Benjamin David Follis, Maidenhead-Berkshire (GB); Marc Kaufman, Woodside, CA (US)

(73) Assignee: Adobe Systems Incorporated, San Jose, CA (US)

( * ) Notice: Subject to any disclaimer, the term of this patent is extended or adjusted under 35 U.S.C. 154(b) by 79 days.

(21) Appl. No.: 14/593,117

(22) Filed: Jan. 9, 2015

(65) Prior Publication Data

US 2016/0204944 A1     Jul. 14, 2016

(51) Int. Cl.
*H04L 29/06* (2006.01)
*H04L 9/32* (2006.01)
*G06F 21/64* (2013.01)

(52) U.S. Cl.
CPC ............ *H04L 9/3247* (2013.01); *G06F 21/64* (2013.01); *H04L 63/12* (2013.01)

(58) Field of Classification Search
CPC .............................. H04L 9/3247; H04L 63/12
See application file for complete search history.

(56) References Cited

U.S. PATENT DOCUMENTS

| | | | | |
|---|---|---|---|---|
| 6,021,202 A * | 2/2000 | Anderson | ............... | G06F 17/24 705/18 |
| 7,167,844 B1 * | 1/2007 | Leong | .................... | G06Q 30/04 705/37 |
| 7,197,143 B2 * | 3/2007 | Duerr | .................... | G11B 19/122 380/229 |
| 7,272,628 B1 | 9/2007 | Pravetz et al. | | |
| 7,620,682 B1 | 11/2009 | Pravetz et al. | | |
| 8,190,904 B2 * | 5/2012 | Hatter | ................... | G06Q 20/02 713/178 |
| 8,966,021 B1 * | 2/2015 | Allen | .................. | G06F 9/45533 709/220 |
| 2002/0046337 A1 * | 4/2002 | Micali | .................... | G06Q 20/02 713/158 |
| 2002/0138735 A1 * | 9/2002 | Felt | .................... | G06Q 20/3829 713/176 |

(Continued)

*Primary Examiner* — Mahfuzur Rahman
(74) *Attorney, Agent, or Firm* — Finch & Maloney PLLC

(57) ABSTRACT

Techniques are disclosed for providing an electronic signature service where the content of an electronic document to be signed remains unknown to the service. A sender of the electronic document negotiates a specification for encoding the electronic document. In particular, the specification does not include any content of the electronic document. In this manner, the content of the electronic document can be encrypted and securely transmitted between the sender and the signer via the electronic signature service using one or more data packets conforming to the specification without permitting the electronic signature service to read or otherwise decipher the content. The specification enables the electronic signature service to certify that the signer has received the electronic document and assented to its terms. Further, the specification enables the electronic signature service to perform authentication and transaction logging operations associated with obtaining an electronically signed version of the electronic document.

18 Claims, 7 Drawing Sheets

(56) References Cited

U.S. PATENT DOCUMENTS

| | | | |
|---|---|---|---|
| 2006/0265590 A1* | 11/2006 | DeYoung | H04L 9/3263 713/176 |
| 2008/0209516 A1* | 8/2008 | Nassiri | G06F 21/32 726/3 |
| 2008/0235577 A1* | 9/2008 | Veluchamy | G06F 17/243 715/268 |
| 2011/0093807 A1* | 4/2011 | Dunn | G06F 17/243 715/780 |
| 2011/0179119 A1* | 7/2011 | Penn | G06Q 90/00 709/205 |
| 2012/0096559 A1* | 4/2012 | Ifrim | H04L 63/12 726/26 |
| 2012/0303962 A1* | 11/2012 | Ghani | G06F 17/243 713/176 |
| 2013/0095864 A1* | 4/2013 | Marovets | H04W 4/14 455/466 |
| 2015/0178252 A1* | 6/2015 | Dunn | G06F 17/2247 715/234 |
| 2015/0295922 A1* | 10/2015 | Dunn | H04L 63/0861 713/178 |

* cited by examiner

PRIVATE ELECTRONIC SIGNATURE SERVICE FOR ELECTRONIC DOCUMENTS

FIELD OF THE DISCLOSURE

This disclosure relates to the field of data processing, and more particularly, to techniques for providing a private electronic signature service for electronic documents.

BACKGROUND

Electronic documents are an alternative to paper documents. An electronic signature functions as an indication that a person adopts the content of the electronic document. Electronic documents are often exchanged between a sender and a signer using different computers that are connected via the Internet or another communication network. Since there is no physical copy of the document, certain measures must be undertaken to ensure that the integrity and confidentiality of each document is maintained when the document is transmitted from one party to another. An intermediate, third party service may be used to obtain electronic signatures. For example, a sender provides an unsigned copy of a document to the third party service, which in turn provides the document to the signer. The signer then applies an electronic signature to the document. The signed document is then returned to the sender via the third party service. With some existing techniques, the third party service reads the document as it is transmitted between the parties, which can potentially compromise the security of sensitive information that is intended to remain confidential. Thus, there is a need for improved techniques for providing an electronic signature service where the content of an electronic document to be signed remains unknown to the electronic signature service.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
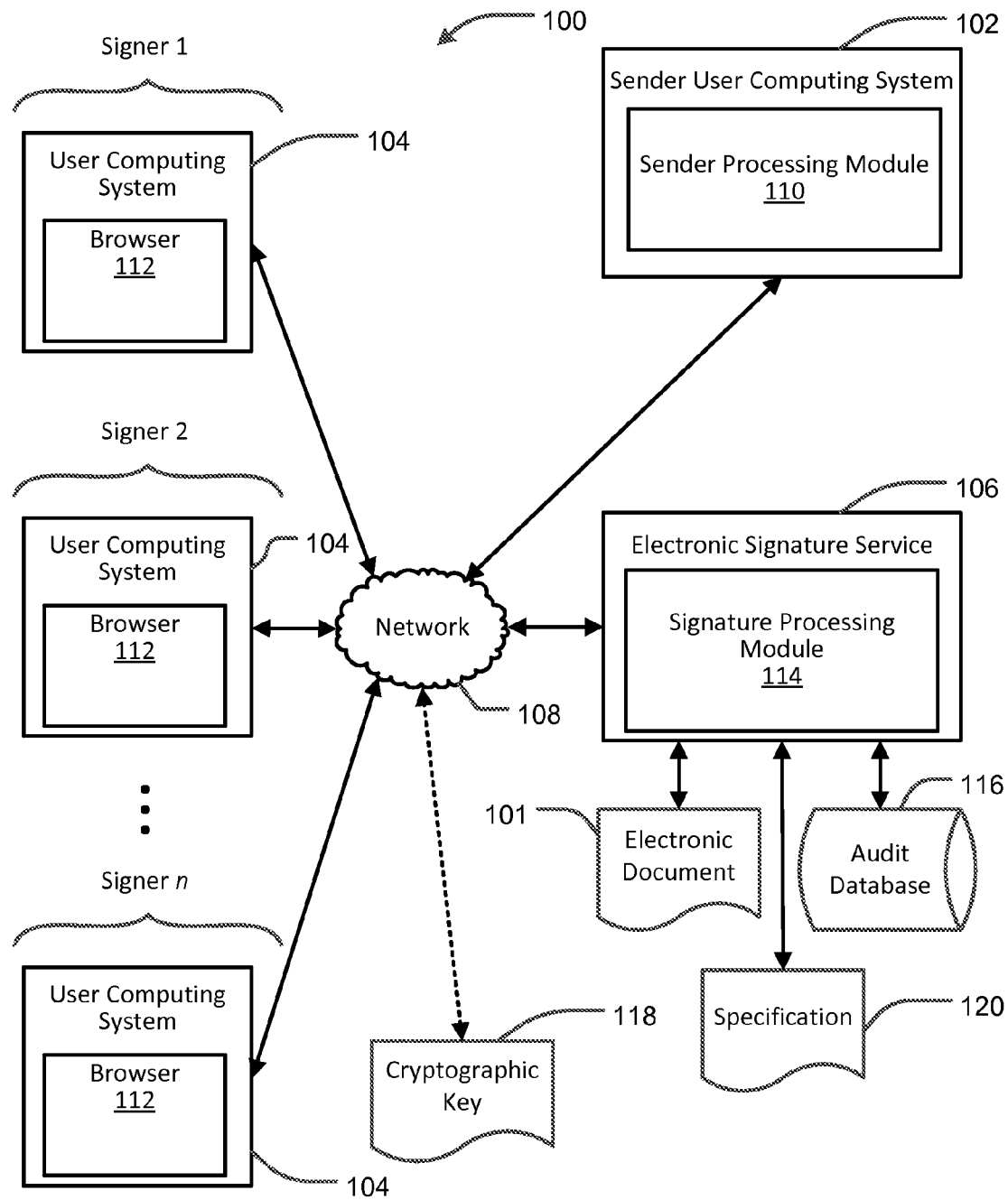
FIG. 1 shows an example system for providing an electronic signature service, in accordance with an embodiment of the present invention.

With some existing techniques, individuals or entities wishing to make use of an electronic signature service must reveal the content of the electronic document to the service. For instance, some existing electronic signature services use the content of the document for authentication and validation purposes, or for identifying a location within the document where the signature is to be applied. However, sometimes the document contains confidential information that the user does not wish to reveal to the electronic signature service under any circumstances.

To this end, and in accordance with an embodiment of the present invention, a technique is disclosed for providing a private electronic signature service where the content of an electronic document to be signed remains unknown to the service. A sender of the electronic document and the private electronic signature service negotiate a data encoding specification for encoding the electronic document. The specification defines a data structure and a file format of the electronic document, including, for example, the number of pages in the document, the size (e.g., in pixels) of images corresponding to pages of the document, a data structure describing any input fields to be filled out by the signer (e.g., field data types, field positions relative to page, or field names), or any other information used by the signer to enter information onto the document (e.g., signature, date, name, title, employer, and so forth). The specification is agreed upon by the sender and the electronic signature service before the document is sent to the signer for signature. As will be described in further detail below with respect to FIG. 2, the data structure defined by the specification includes a data block and byte positions within the data block that correspond to bytes for a given page and bytes corresponding to a representation of the entire document (e.g., where the document is represented in a Portable Document Format, or PDF, format). In some embodiments, the specification defines a format that the fillable fields of the document can be rendered into. In particular, the specification does not include any content of the electronic document. In this manner, using one or more data packets conforming to the specification, the content of the electronic document can be encrypted and privately transmitted between the sender and the signer via the electronic signature service without permitting the electronic signature service to read or otherwise decipher the content. By using data packets conforming to the specification, the electronic signature service can certify that the signer has received the electronic document, or a particular version of the document, and assented to that document by providing an electronic signature. Further, the electronic signature service can perform authentication and transaction logging operations associated with process of obtaining an electronically signed version of the electronic document. Numerous configurations and variations will be apparent in light of this disclosure.

As used in this disclosure, the term "sender" refers to a computing device or computing system that is configured to send an unsigned version of an electronic document, which is encoded as a series of data packets, to one or more other computing devices or computing systems, generally via a data communication network such as the Internet or an intranet. The signer is further configured to receive a signed version of the electronic document, which is also encoded as a series of data packets, from the other computing devices or systems.

As user in this disclosure, the term "signer" refers to a computing device or computing system that is configured to receive, either directly or indirectly, an electronic document from a sender. The signer is also configured to enable one or more people to electronically input their signatures, and to apply those signatures to the electronic document.

As used in this disclosure, the term "electronic signature service" refers to a computing device or computing system that is configured to manage the exchange of an electronic document between a sender and one or more signers. For instance, the electronic signature service may receive an unsigned version of the electronic document from a sender and further provide the unsigned document to a signer for execution of a signature. The electronic signature server may additionally or alternatively return a signed version of the electronic document to the sender, as well as perform other document authentication and management functions. Other examples will be apparent in view of the present disclosure.

As used in this disclosure, the term "electronic signature" refers an indication associated with an electronic document establishing that a person signing the document endorses the contents of the document with the intent to affix his or her signature to the document. An electronic signature may include, for example, an electronically generated symbol or sequence of characters attached to or logically associated with a document and executed or adopted by a person. The electronic signature can be used to assure that the integrity and authenticity of the document, as well as the non-repudiation of the signer, is maintained throughout signing processes, including during electronic transmission of the document between different computing devices. The recipient of an electronically signed document can verify that the signature originated with the signer, that the document has not been altered since the electronic signature was applied, and that the signer has not repudiated or withdrawn his or her signature from the document.

Figure 2:
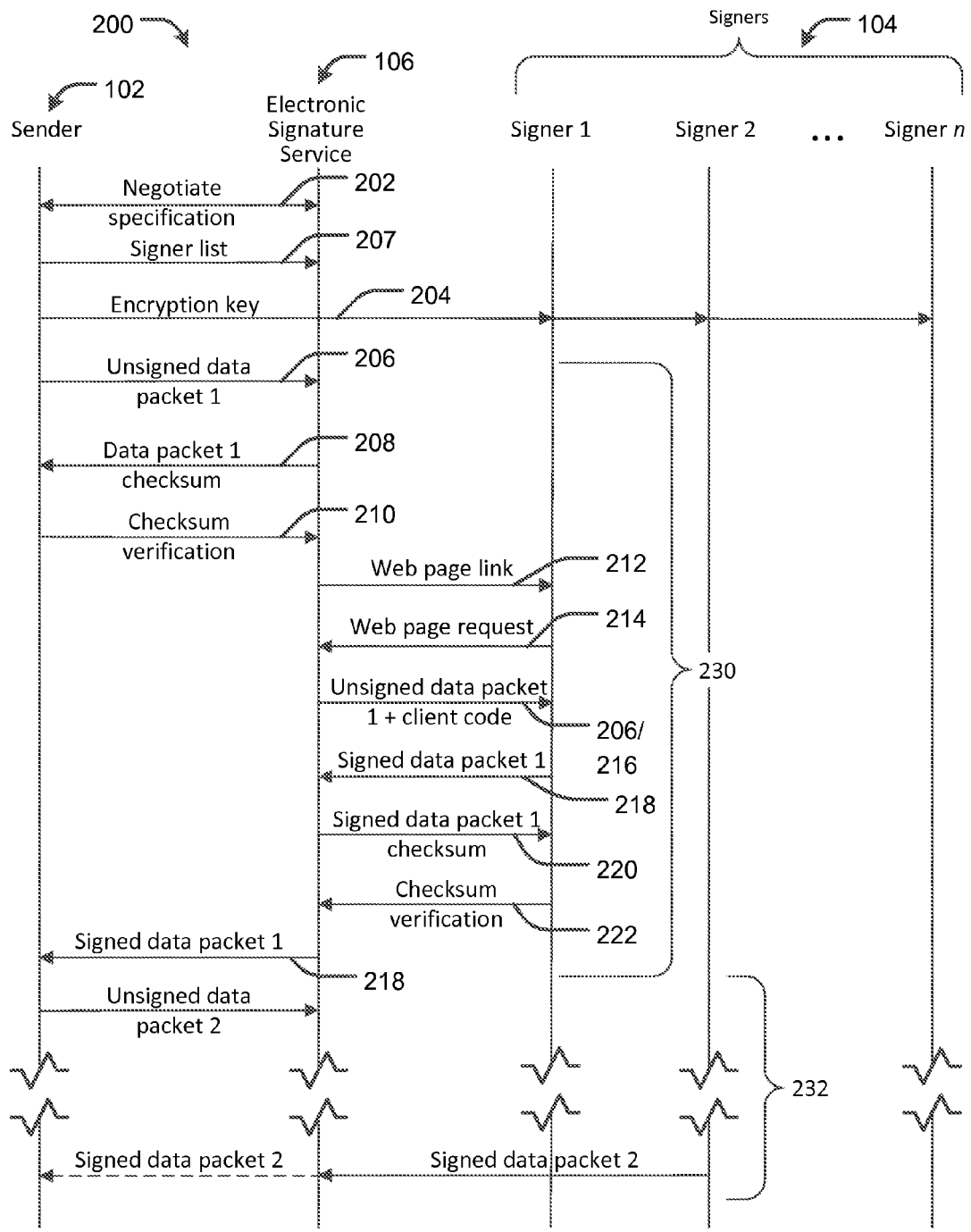
FIG. 2 shows an example data flow diagram for providing an electronic signature service, in accordance with an embodiment of the present invention.

As used in this disclosure, the term "negotiate" refers to a process in which two or more entities (e.g., computers, servers, or other data processing services) agree upon a data encoding specification to be utilized by at least one of the entities, such as described with respect to FIG. 2. For example, a first entity may send a proposed data encoding specification to a second entity. The second entity may, in response, reply to the first entity with a message agreeing to the proposed data encoding specification, thereby completing the negotiation.

Example System

FIG. 1 shows an example system 100 for providing an electronic signature service where the content of an electronic document to be signed remains unknown to the service, in accordance with an embodiment. The system 100 includes a user computing system 102 for a sender of an electronic document 101, one or more user computing systems 104 for signers of the electronic document 101, and a server 106 for providing an electronic signature service. The system further includes a sender processing module 110, one or more browsers 112, a signature processing module 114, and an audit database 116. The sender processing module 110, the browser(s) 112, the signature processing module 114, and the audit database 116 can each be executed and accessed by the sender 102, the signer(s) 104, the electronic signature service 106, or any combination of these. In cases where the system 100 includes more than one user computing system 102, 104, or server 106, such user computing systems and servers can be interconnected to a wired or wireless data communications network 108 (e.g., the Internet or an intranet). The sender processing module 102 is configured to generate and provide the electronic document 101 and any related data (e.g., a cryptographic or encryption key 118) to the signer(s) 104 either directly or via the electronic signature service 106 in one or more data packets that conform to a data encoding specification 120, such as described with respect to FIG. 2. An example of a data flow between components of the system 100 is described in further detail with respect to FIG. 2. In some cases, the electronic document 101, the sender processing module 110, the browser 112, the signature processing module 114, the audit database 116, or any combination of these can reside on a cloud-based computing system. The browser 112 may include, for example, a web browser (e.g., Firefox, Internet Explorer, Chrome, Opera, and Safari), which can be used to create, modify, view and retrieve the electronic document 101, such as a contract or other document requiring a signature to indicate assent to or acceptance of the terms set forth in the document 101.

FIG. 2 shows an example data flow diagram 200 for providing an electronic signature service where the content of an electronic document to be signed remains unknown to the service, in accordance with an embodiment. The data flow depicted in FIG. 2 may, for example, be implemented by all or portions of the system 100 of FIG. 1. In this example, data flows between the sender 102, one or more signers 104, and the electronic signature service 106, are described with respect to the system 100 of FIG. 1. A portion of the data flow occurring during a process of obtaining an electronic signature for one signer 104 (e.g., Signer 1) is generally indicated in FIG. 2 at 230. Initially, the sender 102 and the electronic signature service 106 negotiate a data encoding specification 202 for encoding data associated with the electronic document 101, including any electronic signatures applied to the document. The specification can include a file format for encoding the contents of the electronic document 101, the number of pages in the document, the size (e.g., in pixels) of images corresponding to pages of the document, a data structure describing any input fields to be filled out by the signer (e.g., field data types, field positions relative to page, field names), or any other information used by the signer to enter information onto the document (e.g., signature, date, name, title, employer, and so forth). The specification may be maintained and published a priori by the electronic signature service 106, or may be agreed to by the sender 102 on a sender-by-sender basis.

In some embodiments, the agreed upon data structure and file format has sections for field descriptions, and information for the signer to sign. These fields are rendered on something presented to the user, such as an image. Accordingly, the data structure includes sections that refer to binary chunks representing individual pages (e.g., rasterized images such as JPEG or PNG). The data structure also contains a pointer to a binary chunk that corresponds to some total representation of the document (e.g., PDF). Various structures can be used when the electronic signature service 106 and sender 102 agree on such structures. In one example, the entire contents of the electronic document 101 may be included in a base64 encoded XML document. In another example, a compact compressed representation of the electronic document 101, or a raw binary stream of the electronic document 101 with specific byte positions known, may be used. It will be understood that other ways of encoding the information in the electronic document 101 can be used in conjunction with various embodiments, as long as the data packet from the sender 102 conforms to a specification agreed upon by both the sender 102 and the service 106, and that the encoded information includes every field in the specification. For example, in some cases a complete representation of the information may not be required (but instead may be optional) if both the sender 102 and the service 106 agree that some information may be omitted.

Prior to sending the electronic document to the electronic signature service 106 for signature by the first or sole signer, the sender 102 generates an unsigned data packet 206 conforming to the agreed to specification. As used in this disclosure, the term "unsigned data packet" refers to data associated with the electronic document 101 before the document is signed by a given signer (e.g., Signer 1, Signer 2, . . . Signer n). The sender 102 encrypts the unsigned data packet 206 with an encryption key 204 known only to the sender 102 and the signer 104 or signers of the electronic document 101. The sender 102 sends the encryption key 204 directly to the signer 104 or signers. The electronic signature service 106 does not have access to the encryption key 204. The sender 102 further sends the encrypted data packet 206, along with a description of the encryption algorithm (e.g., AES), and a list of signers 207 to the electronic signature service 106. The list of signers 207 includes data representing an identity of each individual that will sign the electronic document 101, as designated by the sender 102 (e.g., a name, a user identifier, an electronic mail address, an Internet Protocol (IP) address, or another suitable form of identification).

In an embodiment, the data packet 206 can be encrypted using various encryption schemes, such as those conforming to the Advanced Encryption Standard (AES) and the ElGamal encryption system. Two mathematically paired keys, a private key and a public key, may be used in conjunction with a public-key algorithm to encrypt and decrypt the data packet 206. As non-limiting examples, asymmetric-key algorithms may include RSA (Rivest, Shamir, and Adelman's algorithm), DSA (Digital Signature Algorithm), ECDSA (Elliptic Curve Digital Signature Algorithm), as well as other asymmetric-key algorithms. The public-key infrastructure allows the sender of, or a distributor of, the electronic document 101 to ensure that no one other than the signer of the document can read the contents of the document. Likewise, using a private key to encrypt the electronic document 101, the signer 104 can assure both the authenticity and the integrity of signed electronic document 101 while preventing entities other than the sender from reading the contents of the document.

When the electronic signature service 106 receives the encrypted unsigned data packet 206, the service generates a checksum 208 for the data packet 206. Examples of algorithms that can be used to generate the checksum 208 include SHA-2 (Secure Hash Algorithm Series 2), SHA-3, or any other cryptographic has function that is cryptographically strong at the time the electronic document 101 is sent. The checksum 208 is sent back to the sender 102 for verification. The sender 102 independently generates a checksum for the same unsigned data packet 206 and compares this checksum with the checksum 208 generated by the electronic signature service 106. If the checksums match, the sender 102 sends a checksum verification 210 to the electronic signature service 106. Once the electronic signature service 106 receives the checksum verification 210, the service records audit information in the audit database 116. The audit information may include, for example, the unsigned data packet 206, the checksum 208 and the checksum verification. Other audit information may be recorded, such as the current time and date, or other data that represents the transaction between the sender and the electronic signature service.

The electronic signature service 106 sends a web page link 212 (e.g., an HTTP hyperlink, or a link to a Flash-based or other general purpose document viewing application) or other electronic notification uniquely associated with the electronic document 101 to the first or sole signer 104 of the document 101. For example, if there are n signers in the signer list, the electronic signature service 106 may send the link to signer m, where m is less than or equal to n. The web page link 212 or notification may, for example, be sent in the form of an e-mail or electronic message (e.g., Simple Messaging Service or SMS message).

When the signer 104 (e.g., Signer m) receives the web page link 212, the signer can select the link within the browser 112 to send a web page request 214 (e.g., an HTTP request) to the electronic signature service 106. In response to receiving the web page request 214, the electronic signature service 106 presents a web page to the signer 104, which includes the unsigned data packet 206 and associated client-side executable code 216 (e.g., Javascript code). The provisioning of the client-side executable code 216 by the electronic signature service 106 relaxes constraints on the type of device being used by signer of the electronic document. For example, in some cases the signer 104 can securely read and electronically sign the electronic document 101 using an existing web browser, such as Firefox, Internet Explorer, Chrome, Opera, or Safari, that is configured to execute Javascript code provided by the electronic signature service 106. Furthermore, using the client-side executable code 216, the signer 104 can decrypt the electronic document 101 using the encryption key 204 that is received directly from the sender 102. This is in contrast to some existing electronic signature techniques where the electronic signature service acts as a certificate issuing authority, which manages the trust relationships between the sender and the signer. In such existing cases, the electronic signature service requires the signer's device to register with, and obtain a secure certificate from, the electronic signature service prior to receiving the unsigned electronic document.

The web page, in conjunction with the client-side code, causes the browser 112 to perform a sequence of operations. First, the browser 112 receives the data packet 206 (as provided by the sender 102) from the electronic signature service 106 and the sender verification information 210. The client-side code 216, when executed by the signer 104, confirms the unsigned data packet 206 conforms to the verification information 210. The verification information 210 presented to the signer may include, for example, a replay of the verification confirmation message the service 106 received from the sender 102 when the sender 102 originally sent the message to the service 106. In another example, the verification information 210 may represent any form of private information not known to the service 106 (i.e., information known only to the sender 102 or signer 104). This may be in the form of an encrypted digital signature or a piece of private information encrypted with the encryption key 204 associated with the electronic document 101. In any case, the verification of these messages must be able to be performed by the sender 102 and the signer 104. If, for example, PKI is used, the messages may also be verified by the service 106, and allow the service 106 to reject verification messages not generated by the sender 102 or the signer 104. The verification information 210 may be used, for example, to detect if and when the service 106 impermissibly introduces new data into the electronic document 101 or undetectably corrupts the transmitted contents of the electronic document 101. Additionally or alternatively, the verification information 210 may be used, for example, to prevent the sender 102 or the signer 104 from repudiating the contents of the electronic document 101 (e.g., a legal contract), and the service 106 can further prove it acted faithfully during the course of the transaction.

The signer 104 then prompts the user for the encryption/decryption key 204, which is received directly from the sender 102. The signer 104 then decrypts the unsigned data packet 206 using the key 204. The signer 104 renders a user interface (e.g., within the browser 112 or in a separate window) that is configured to receive an input from the user to electronically sign the document 101 at the location(s) designated by the sender 102. Such an input may include keyboard or mouse inputs, for example, where the user types his or her name into an input field rendered in the browser 112. The signer 104 converts the signature input into the format specified in the unsigned data packet 206. The signature input and any other information associated with the transaction is then encrypted into a new, signed data packet 218 using the encryption/decryption key 204. As used in this disclosure, the term "signed data packet" refers to data associated with the electronic document 101 after it is signed by a given signer. The encrypted, signed data packet 218 is then sent to the electronic signature service 106.

When the electronic signature service 106 receives the encrypted, signed data packet 218, the service the service generates a checksum 220 for the signed data packet 218. The checksum 220 is sent back to the signer 104 for verification. The signer 104 independently generates a checksum for the same signed data packet 218 and compares this checksum with the checksum 220 generated by the electronic signature service 106. If the checksums match, the signer 104 sends a checksum verification 222 to the electronic signature service 106. Once the electronic signature service 106 receives the checksum verification 222, the service records audit information in the audit database 116. The audit information may include, for example, the signed data packet 218, the checksum 220 and the checksum verification 222. Other audit information may be recorded, such as the current time and date, or other data that represents the transaction between the signer 104 and the electronic signature service 106.

The electronic signature service 106 sends the encrypted, signed data packet 218 to the sender 102. The sender 102 then decrypts the signed data packet 218, performs any transformations (e.g., impressment of the signature input into the images of PDF representation of the electronic document), and alters any fields for the next signer 104, if there are any other signers in the signer list 207 that have not yet signed the electronic document 101. The sender 102 then repeats the process for the next signer 104, if any, until all signers on the signer list 207 have signed the electronic document 101, such as generally indicated at 232. For example, the process generally indicated at 230 is repeated for each signer 104; that is, Signer 1 through Signer n.

It will be understood that, according to various embodiments described in this disclosure, any or all of the employed checksum and encryption/decryption algorithms may be specified in the agreed upon specification 202. For example, the specification 202 may specify that the checksums comply with SHA-2 and that the data packets comply with RSA.

Example Methodology

Figure 3A:
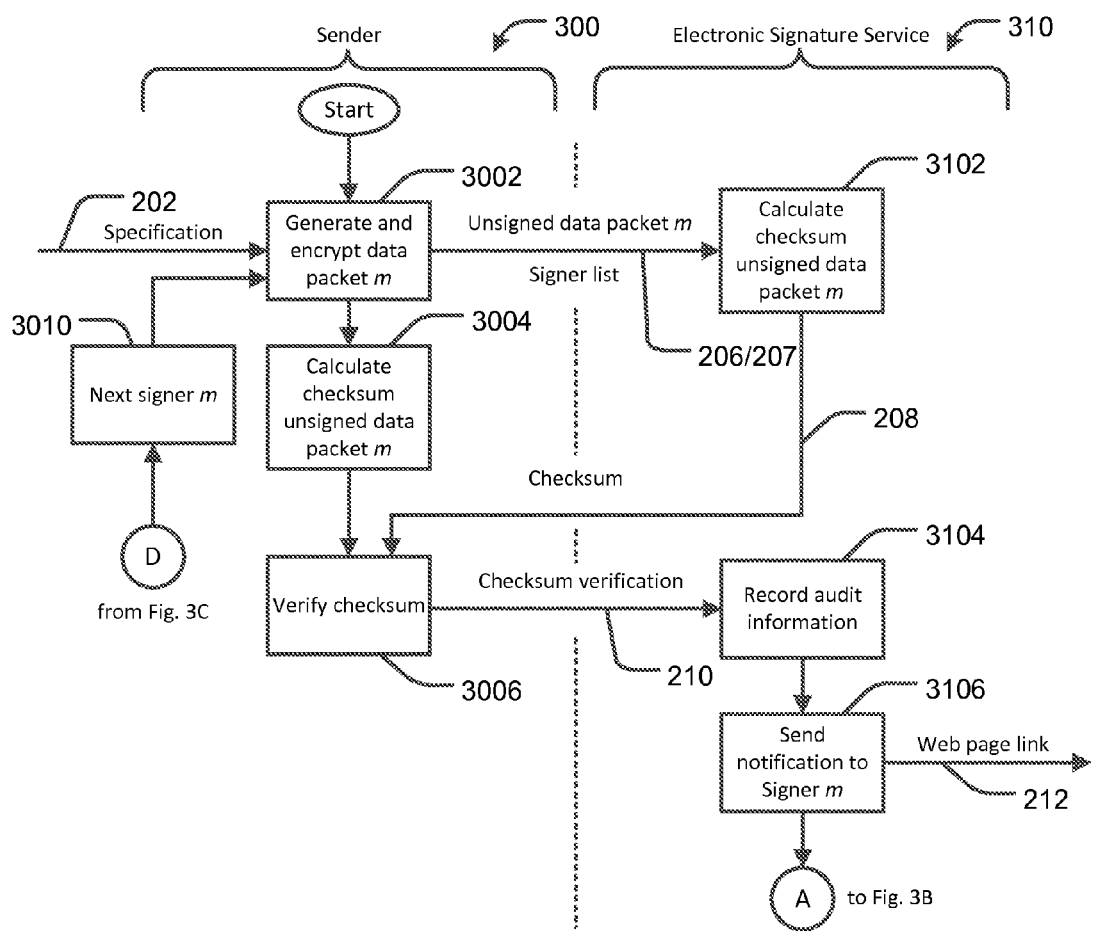
FIGS. 3A, 3B and 3C show a flow diagram of several example methodologies for providing an electronic signature service, in accordance with several embodiments of the present invention.
Figure 3B:
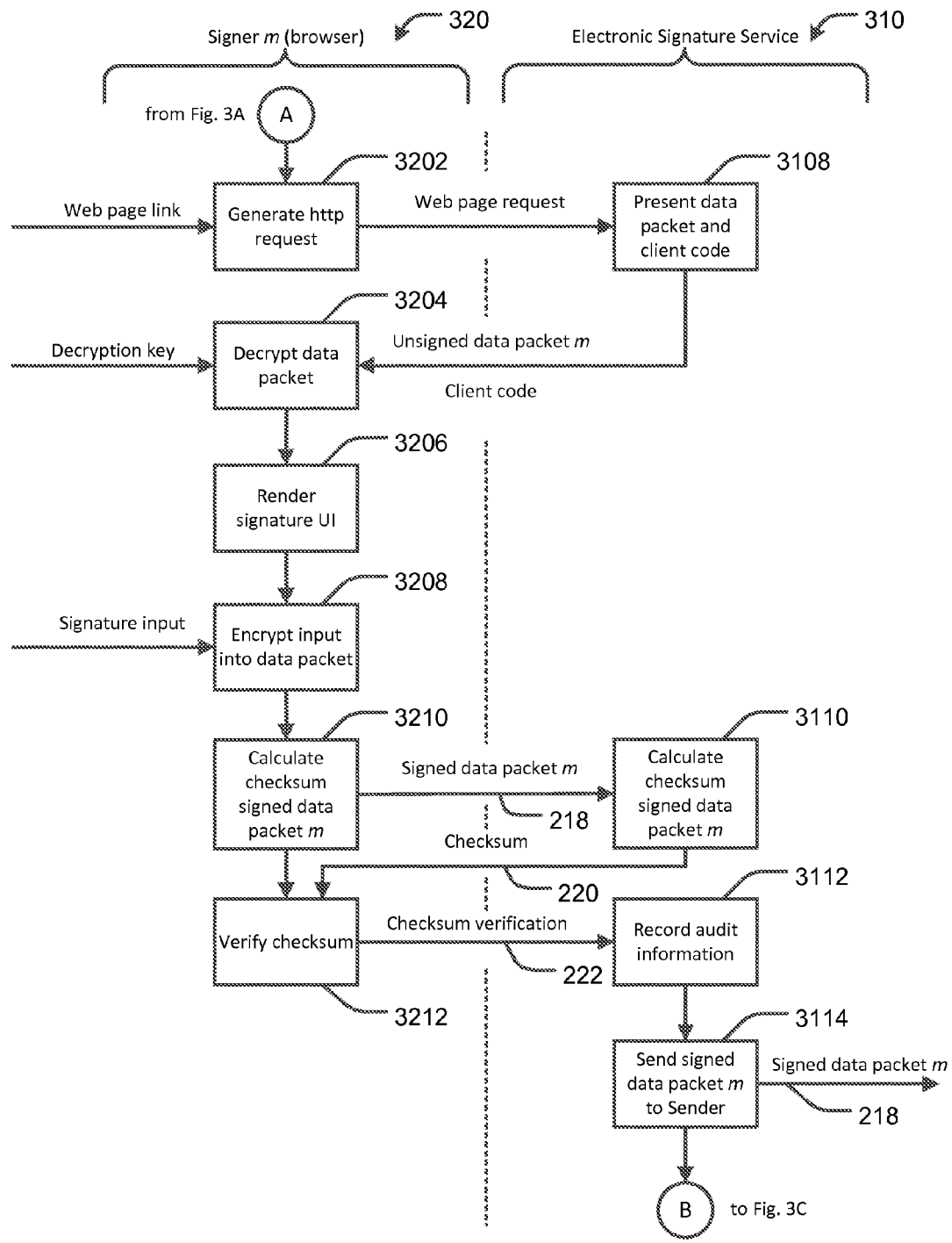
Figure 3C:
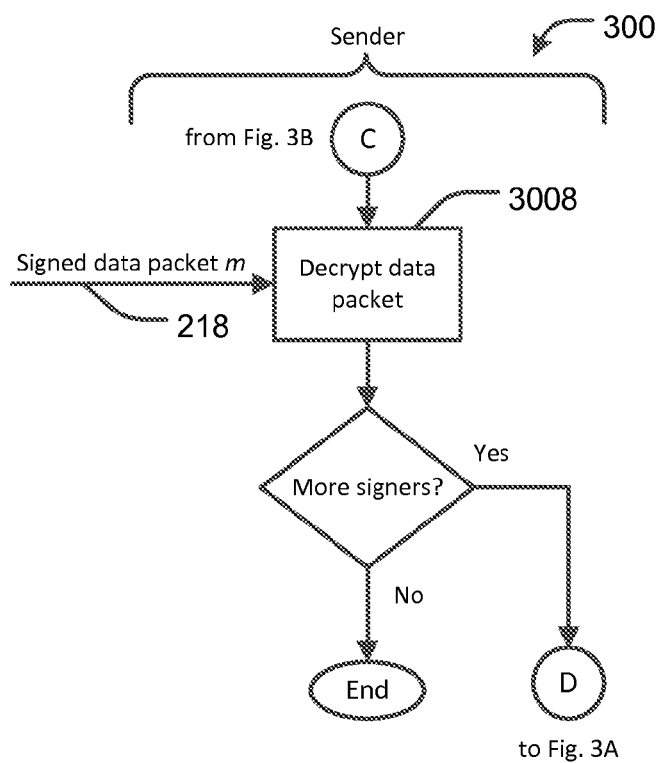

FIGS. 3A, 3B and 3C show a flow diagram of several example methodologies 300, 310, 320 for providing an electronic signature service where the content of an electronic document to be signed remains unknown to the service, in accordance with an embodiment. The method 300 may be performed, for example, in whole or in part by the sender processing module 110 of FIG. 1. The method 310 may be performed, for example, in whole or in part by the signature processing module 114 of FIG. 1. The method 320 may be performed, for example, in whole or in part by the browser 112 of FIG. 1. The example methods 300, 310 and 320 are described in relation to each other and referred to generally as sender method 300, service method 310 and signer method 320. It will be understood, however, that all or any portions of the methods 300, 310 and 320 can be performed by any portion of the system 100 of FIG. 1, and that the scope of each example method 300, 310 and 320 is described in the following manner only for clarity.

Referring first to FIG. 3A, sender method 300 begins by generating and encrypting 3002 an unsigned data packet m including the electronic document based on a data encoding specification, such as described above with respect to FIG. 2. Sender method 300 continues by calculating 3004 a checksum for the data packet. Service method 310 begins by receiving the encrypted, unsigned data packet m and calculating 3102 a checksum for the data packet. Sender method 300 continues by receiving and verifying 3006 that the checksum calculated by the service method 310 at step 3102 matches the checksum calculated by the sender method 300 at step 3004. Upon such verification, the service method 310 continues by recording 3104 audit information, such as described above with respect to FIG. 2. Service method 310 continues by sending 3106 a notification to signer m that the electronic document is ready to be signed. The notification may include, for example, a web page link, such as described with respect to FIG. 2.

Referring next to FIG. 3B, signer method 320 begins by receiving the notification sent by the service method at step 3106 and, in response, generating 3202 an HTTP request or other suitable instruction to retrieve the web page linked in the notification. The web page may, for example, be hosted by the electronic signature service 106 or another web server. Service method 310 continues by receiving the HTTP request and, in response, presenting 3108 the unsigned data packet m and associated client-side code to the signer 104, such as described with respect to FIG. 2. For example, the client-side code may include Javascript that, when executed by the browser 112, causes the browser 112 to perform one or more of the following steps 3202 through 3212.

Figure 4:
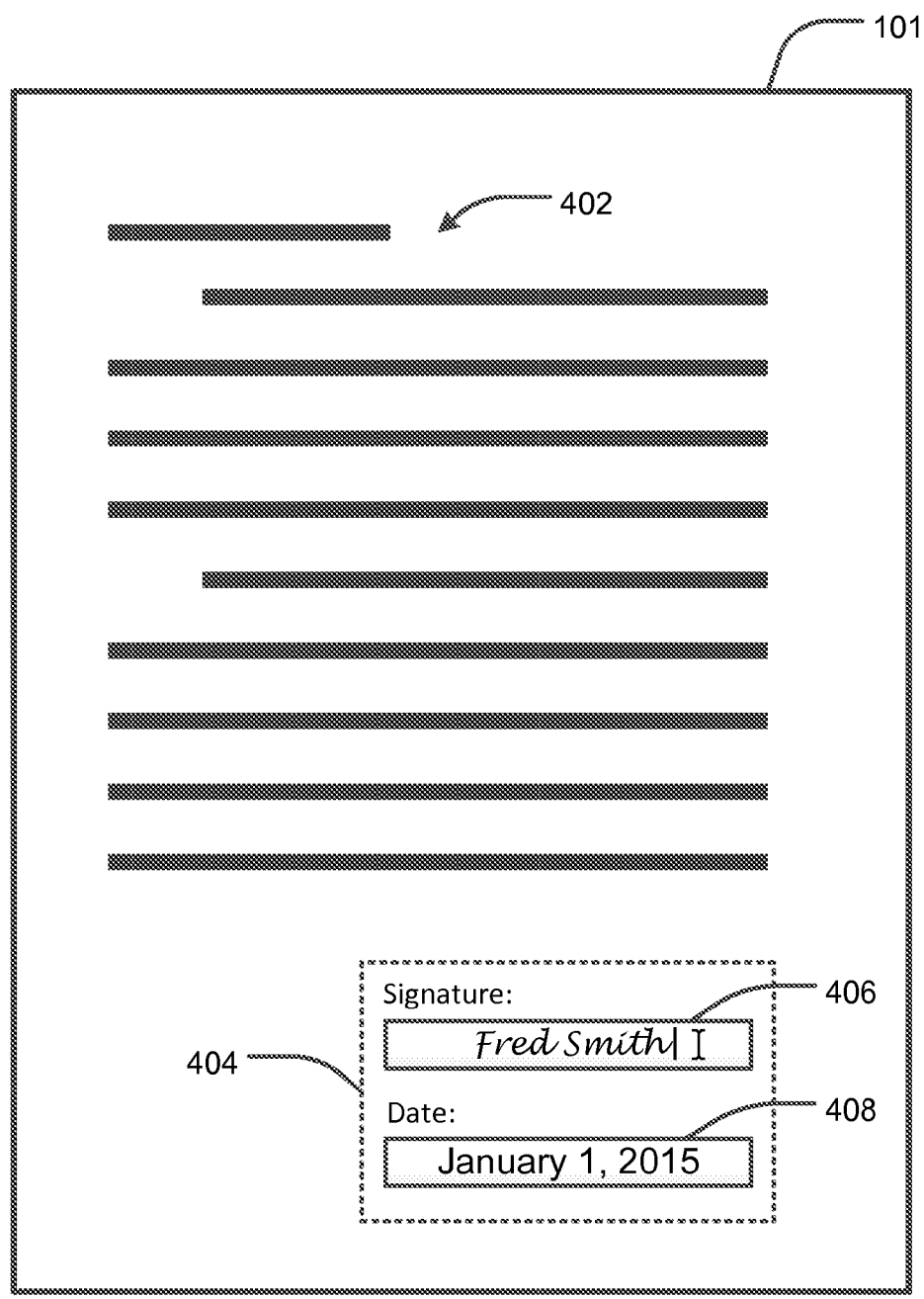
FIG. 4 shows a screenshot of an example electronic document and graphical user interface, in accordance with an embodiment of the present invention.

In an embodiment, signer method 320 continues by decrypting 3204 the unsigned data packet m using a decryption key provided by the sender 102. Signer method 320 continues by rendering a signature user interface (e.g., a text input box for inputting an electronic signature within the browser). An example of such a signature user interface is shown in FIG. 4. The electronic signature is an indication (e.g., symbols or characters) that a person signing the electronic document endorses the contents of the document with an intent to affix his or her signature to the document. Once the signature input is received by the signer 104, the signer method 320 continues by encrypting 3208 the signature input into a signed data packet m and calculating 3210 a checksum for the signed data packet m. In some embodiments, the signature input in the signed data packet m conforms to the same format in the specification used to generate the unsigned data packet m in step 3002 (otherwise the sender 102 may not understand the signed data packet). In some alternate embodiments, the sender 102 can provide client side code to receive the signature input, which in turn the service 106 provides to the signer 104 for execution by the signer 104. Such client side code can then perform transformations on the signature input according to the format in the specification. Service method 310 continues by receiving the encrypted, signed data packet m and calculating 3110 a checksum for the data packet. Signer method 320 continues by receiving the checksum and verifying 3212 that the checksum calculated by the service method 310 at step 3110 matches the checksum calculated by the signer method 320 at step 3210. Upon such verification, the service method 310 continues by recording 3112 audit information, such as described above with respect to FIG. 2. Service method 310 continues by sending 3114 the encrypted, signed data packet m to the sender 102.

Referring next to FIG. 3C, sender method 300 continues by decrypting 3008 the signed data packet m. The signed version of the electronic document 101 can then be obtained from the decrypted signed data packet. If there is only one designated signer of the document, the sender method 300, the service method 310 and the signer method 320 end. If there are more signers who have not yet signed the document 101, then the sender method 300 continues by selecting 3010 the next signer and repeating all or portions of the various methodologies described in this disclosure.

Example Graphical User Interface

FIG. 4 shows a screenshot of an example electronic document 101 and graphical user interface (GUI) 404, in accordance with an embodiment. The document 101 contains content 402 (e.g., text, graphics, images, sounds, or other information), which when encrypted is not decipherable unless and until it is decrypted using a suitable decryption technique. The GUI 404 may, for example, be rendered by the browser 112 of FIG. 1. The GUI 404 can include a signature block 406 and a date block 408 for entering an electronic signature and date, respectively. Alternatively, or in addition to the signature block 406 and the date block 408, the GUI may include any other input elements that are associated with the electronic document, such as a title, company name, address, e-mail address, phone number, identification or registration number, or any other information or inputs that the sender 102 wishes to obtain from the signer 104 on the electronic document 101. The size and position of the GUI 404 can be determined from the specification used to generate and encode the data packet(s) associated with the electronic document 101, such as the unsigned and signed data packets 206 and 218 described with respect to FIG. 2. In some embodiments, the electronic signature and other inputs are encrypted by the signer 104 before the signed document 101 is transmitted to the sender 102.

Example Computing Device

Figure 5:
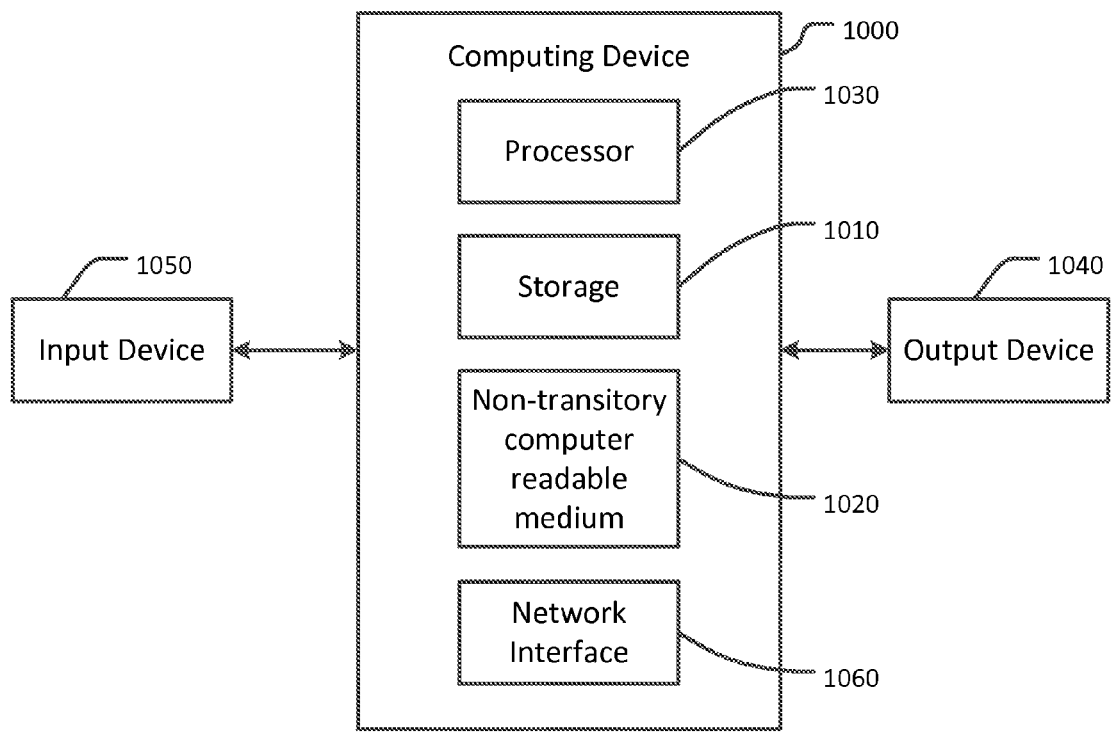
FIG. 5 is a block diagram representing an example computing device that may be used in accordance with an embodiment of the present invention.

FIG. 5 is a block diagram representing an example computing device 1000 that may be used to perform any of the techniques as variously described in this disclosure. For example, the user computing system, the desktop publishing application, the document conversion module, the document viewer, or any combination of these may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the sender processing module 110, the browser 112, the signature processing module 114, the electronic document 101, the audit database 116, or any combination of these, can be implemented in software, such as a set of instructions (e.g., HMTL, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. As used in this disclosure, the terms "non-transient" and "non-transitory" exclude transitory forms of signal transmission. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. For example, in some embodiments, the electronic signature service 106 records information pertaining to the content privacy-preserving electronic documents in a distinct manner from other electronic documents (e.g., non-privacy-preserving documents). The service 106 may be queried regarding these documents without considering every other kind of document in the system. To accomplish this, the service may store these documents with metadata or flags (e.g., database flags or specific file formats) for designating the documents as privacy preserving documents (e.g., legal contracts). In some embodiments, the electronic signature service 106 enables reporting on, and automatic notification of, events relating to the content privacy-preserving electronic document in a manner that is specific to the document. Such events may, for example, include the signature rate (e.g., the percentage of designated signers who actually sign), the amount of time needed to render a page of the electronic document for a signer, and how many times a signature is refused. Other reports may, for example, include user ratings on the usability of the system, and which senders in an organization are or are not using privacy preserving contracts (e.g., it may be a violation of the organization's polices to fail to use a privacy preserving contract). In some embodiments, the electronic signature service 106 makes available all received data packets to all parties, along with all audit information, thereby enabling the parties to independently audit the transactions. In some embodiments, the file to be signed is a PDF that has been encrypted by one of the available PDF encryption methods (such as passwords, where the password is known to the participants but not to the Service). In some embodiments, the electronic signature service sends and receives encrypted data packets in a Forms Data Format (FDF) file. Example data communication techniques that can be implemented in accordance with such embodiments are disclosed in U.S. Pat. Nos. 7,272,628 and 7,620,682, which are hereby incorporated by reference in their entireties.

One example embodiment provides a system including a storage having at least one memory, and one or more processors each operatively coupled to the storage. The one or more processors are configured to carry out a process at a server operating an electronic signature service, the process including negotiating, with a sender device, a specification for encoding an electronic document in a data packet; receiving, from the sender device, a first encrypted data packet conforming to the specification, the first encrypted data packet including data representing an electronic document; presenting the first encrypted data packet to a signer device without decrypting the first encrypted data packet at the server; receiving, from the signer device and at the server, a second encrypted data packet conforming to the specification, the second encrypted data packet including data representing an electronic signature, the electronic signature representing an indication associated with the electronic document establishing that a person signing the electronic document endorses a content of the electronic document with the intent to affix the electronic signature to the electronic document; and presenting the second encrypted data packet to the sender device without decrypting the second encrypted data packet at the server. In some cases, the specification is configured to define a characteristic of the electronic document, the characteristic including at least one of a number of pages in the electronic document, a size of an image of a page of the electronic document, a data structure describing an input field to be filled out by a signer of the electronic document, and a data structure having a data block and byte positions within the data block that correspond to a representation of the electronic document. In some cases, the process includes providing computer-executable instructions to the signer device that when executed by the signer device cause the signer device to perform a process including decrypting the first encrypted data packet; rendering a user interface based on the specification, the user interface being configured to receive a user input representing an electronic signature associated with the electronic document; and encrypting the user input into the second encrypted data packet. In some cases, the process includes calculating a first checksum on the first encrypted data packet and calculating a second checksum on the second encrypted data packet. In some such cases, the first encrypted data packet is presented to the signer device in response to receiving a first checksum verification from the sender device. In some other such cases, the second encrypted data packet is transmitted to the sender device in response to receiving a second checksum verification from the signer device. In some cases, the process includes recording audit information associated with at least one of the first encrypted data packet and the second encrypted data packet. In some cases, the system includes a network interface operatively connected to the processor, where the network interface is configured to receive the first encrypted data packet from the sender device via a communications network and further configured to receive the second encrypted data packet from the signer device via the communications network. Another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

Yet another embodiment provides a system including a storage having at least one memory, and one or more processors each operatively coupled to the storage. The one or more processors are configured to carry out a process including receiving, from an electronic signature service device, a first encrypted data packet conforming to a specification, the first encrypted data packet including data representing an electronic document; decrypting the first encrypted data packet; rendering a user interface based on the specification, the user interface being configured to receive a user input representing an electronic signature, the electronic signature representing an indication associated with the electronic document establishing that a person signing the electronic document endorses a content of the electronic document with the intent to affix the electronic signature to the electronic document; encrypting the user input into a second encrypted data packet conforming to the specification; and sending the second encrypted data packet to the electronic signature service device. In some cases, the process includes calculating a first checksum on the second encrypted data packet and verifying the first checksum against a second checksum associated with the second encrypted data packet received from the electronic signature service device. In some cases, the process includes generating a request (e.g., a Hypertext Transfer Protocol (HTTP) request) based on a hyperlink received from the electronic signature service device, the hyperlink being associated with the first encrypted data packet. In some cases, the specification is configured to define a characteristic of the electronic document, the characteristic including at least one of a number of pages in the electronic document, a size of an image of a page of the electronic document, a data structure describing an input field to be filled out by a signer of the electronic document, and a data structure having a data block and byte positions within the data block that correspond to a representation of the electronic document. In some such cases, the user interface includes an electronic signature entry field located at a position within the electronic document that is based on the specification. Another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
receiving, from a sender device and at a server operating an electronic signature service via a communication network, a first encrypted data packet including data representing an electronic document, the first encrypted data packet conforming to a specification for encoding the electronic document in a data packet;
presenting the first encrypted data packet to a signer device via the communication network without decrypting the first encrypted data packet at the server;
providing computer-executable instructions to the signer device via the communication network, the computer-executable instructions that when executed by the signer device cause the signer device to perform a process comprising:
decrypting the first encrypted data packet;
rendering a user interface based on the specification, the user interface being configured to receive a user input representing the electronic signature associated with the electronic document; and
encrypting the user input into a second encrypted data packet;
receiving, from the signer device and at the server via the communication network, the second encrypted data packet conforming to the specification, the second encrypted data packet including data representing an electronic signature, the electronic signature representing an indication associated with the electronic document establishing that a person signing the electronic document endorses a content of the electronic document with an intent to affix the electronic signature to the electronic document; and
presenting the second encrypted data packet to the sender device via the communication network without decrypting the second encrypted data packet at the server.

2. The method of claim 1, wherein the specification defines a characteristic of the electronic document, the characteristic including at least one of a number of pages in the electronic document, a size of an image of a page of the electronic document, a data structure describing an input field to be filled out by a signer of the electronic document, and a data structure having a data block and byte positions within the data block that correspond to a representation of the electronic document.

3. The method of claim 1, further comprising calculating a first checksum on the first encrypted data packet and calculating a second checksum on the second encrypted data packet.

4. The method of claim 3, wherein the first encrypted data packet is presented to the signer device in response to receiving a first checksum verification from the sender device.

5. The method of claim 3, wherein the second encrypted data packet is presented to the sender device in response to receiving a second checksum verification from the signer device.

6. The method of claim 1, further comprising recording audit information associated with at least one of the first encrypted data packet and the second encrypted data packet.

7. A computer-implemented method comprising:
receiving, from a server operating an electronic signature service via a communication network, a first encrypted data packet including data representing an electronic document, the first encrypted data packet conforming to a specification for encoding the electronic document in a data packet;
receiving, from a sender device via the server via the communication network, computer-executable instructions that when executed cause a signer device to perform a process comprising:

decrypting the first encrypted data packet;

rendering a user interface based on the specification, the user interface being configured to receive a user input representing an electronic signature, the electronic signature representing an indication associated with the electronic document establishing that a person signing the electronic document endorses a content of the electronic document with an intent to affix the electronic signature to the electronic document;

in response to receiving the user input, encrypting the user input into a second encrypted data packet conforming to the specification; and sending, via the communication network, the second encrypted data packet to the server operating the electronic signature service.

8. The method of claim 7, further comprising calculating a first checksum on the second encrypted data packet and verifying the first checksum against a second checksum associated with the second encrypted data packet received from the electronic signature service device.

9. The method of claim 7, further comprising generating a request based on a hyperlink received from the electronic signature service device, the hyperlink being associated with the first encrypted data packet.

10. The method of claim 7, wherein the specification is configured to define a characteristic of the electronic document, the characteristic including at least one of a number of pages in the electronic document, a size of an image of a page of the electronic document, a data structure describing an input field to be filled out by a signer of the electronic document, and a data structure having a data block and byte positions within the data block that correspond to a representation of the electronic document.

11. The method of claim 10, wherein the user interface includes an electronic signature entry field located at a position within the electronic document that is based on the specification.

12. A system comprising:

a storage; and a processor operatively coupled to the storage, the processor configured to execute instructions stored in the storage that when executed cause the processor to carry out a process at a server operating an electronic signature service, the process comprising:

negotiating, with a sender device via a communication network, a specification for encoding an electronic document in a data packet;

receiving, from the sender device and at the server via the communication network, a first encrypted data packet conforming to the specification, the first encrypted data packet including data representing the electronic document;

presenting the first encrypted data packet to a signer device without decrypting the first encrypted data packet at the server;

providing computer-executable instructions to the signer device via the communication network, the computer-executable instructions that when executed by the signer device cause the signer device to perform a process comprising:

decrypting the first encrypted data packet;

rendering a user interface based on the specification, the user interface being configured to receive a user input representing the electronic signature associated with the electronic document; and encrypting the user input into a second encrypted data packet;

receiving, from the signer device and at the server via the communication network, the second encrypted data packet conforming to the specification, the second encrypted data packet including data representing an electronic signature, the electronic signature representing an indication associated with the electronic document establishing that a person signing the electronic document endorses a content of the electronic document with an intent to affix the electronic signature to the electronic document; and presenting the second encrypted data packet to the sender device via the communication network without decrypting the second encrypted data packet at the server.

13. The system of claim 12, wherein the specification is configured to define a characteristic of the electronic document, the characteristic including at least one of a number of pages in the electronic document, a size of an image of a page of the electronic document, a data structure describing an input field to be filled out by a signer of the electronic document, and a data structure having a data block and byte positions within the data block that correspond to a representation of the electronic document.

14. The system of claim 12, wherein the process includes calculating a first checksum on the first encrypted data packet and calculating a second checksum on the second encrypted data packet.

15. The system of claim 14, wherein the first encrypted data packet is presented to the signer device in response to receiving a first checksum verification from the sender device.

16. The system of claim 14, wherein the second encrypted data packet is transmitted to the sender device in response to receiving a second checksum verification from the signer device.

17. The system of claim 12, wherein the process includes recording audit information associated with at least one of the first encrypted data packet and the second encrypted data packet.

18. The system of claim 12, further comprising a network interface operatively connected to the processor, wherein the network interface is configured to receive the first encrypted data packet from the sender device via the communications network and further configured to receive the second encrypted data packet from the signer device via the communications network.

* * * * *